United States Patent [19]

Edwards

[11] Patent Number: 4,621,835
[45] Date of Patent: Nov. 11, 1986

[54] TWO RETRACTOR PASSIVE RESTRAINT SYSTEM

[75] Inventor: Timothy P. Edwards, Mount Clemens, Mich.

[73] Assignee: American Safety Equipment Corporation, Troy, Mich.

[21] Appl. No.: 741,461

[22] Filed: Jun. 5, 1985

[51] Int. Cl.⁴ ............................................. B60R 21/10
[52] U.S. Cl. ..................................... 280/803; 280/804; 280/807; 280/808
[58] Field of Search .............. 280/802, 803, 804, 807, 280/808

[56] References Cited

U.S. PATENT DOCUMENTS

| | | | |
|---|---|---|---|
| 3,679,228 | 7/1972 | Settimi | 280/808 |
| 3,882,955 | 5/1975 | Kaneko | 280/803 |
| 4,040,645 | 8/1977 | Giffen et al. | 280/802 |
| 4,138,142 | 2/1979 | Wize | 280/803 |
| 4,150,843 | 4/1979 | Reid et al. | 280/802 |
| 4,168,850 | 9/1979 | Stephenson et al. | 280/803 |
| 4,180,283 | 12/1979 | Ziv | 280/802 |
| 4,189,170 | 2/1980 | Tanaka | 280/802 |
| 4,193,613 | 3/1980 | Cachia | 280/804 |
| 4,193,614 | 3/1980 | Felsing | 280/804 |
| 4,211,430 | 7/1980 | Fancy | 280/802 |
| 4,213,637 | 7/1980 | Mauron | 280/802 |
| 4,218,075 | 8/1980 | Rogers, Jr. | 280/804 |
| 4,245,856 | 1/1981 | Ziv | 280/802 |
| 4,266,811 | 5/1981 | Takada | 280/803 |
| 4,290,628 | 9/1981 | Okuyama | 280/803 |
| 4,310,178 | 1/1982 | Sato | 280/802 |
| 4,315,638 | 2/1982 | Takada | 280/803 |
| 4,315,639 | 2/1982 | Booth | 280/803 |
| 4,316,619 | 2/1982 | Suzuki | 280/804 |
| 4,357,035 | 11/1982 | Stamboulian | 280/804 |
| 4,362,320 | 12/1982 | Ogura | 280/802 |
| 4,423,887 | 1/1984 | Packington | 280/802 |

FOREIGN PATENT DOCUMENTS

| | | | |
|---|---|---|---|
| 1101987 | 3/1961 | Fed. Rep. of Germany | 280/803 |
| 151451 | 9/1982 | Japan | 280/802 |
| 2096883 | 10/1982 | United Kingdom | 280/802 |

Primary Examiner—John J. Love
Assistant Examiner—Everett G. Diederiks, Jr.
Attorney, Agent, or Firm—Poms, Smith, Lande & Rose

[57] ABSTRACT

A safety belt restraint system for restraining a passenger in his automotive vehicle seat has a pair of emergency locking safety belt retractors mounted in relatively close proximity to each other on the vehicle door near a lower portion thereof with a single safety belt strap running therebetween and through associated upper and lower belt guides on the door, there being a single connector fitting mounted in fixed relation to a mid-portion of the strap and being releasably anchored in a conventional safety belt buckle anchor located inboard of the vehicle seat, the retractors having large diameter spools sufficient to wind all of the webbing up adjacent to the vehicle door when the connector is released from the buckle. The safety belt restraint system is provided with a strap lifting assembly for a lap portion of the belt to facilitate ease of the user getting in and out of the vehicle, the lifting assembly includes a track located on the door and a motor to lift a connection element, attached to the lap portion of the belt, along the track when the vehicle door is opened, and a switch associated with the single connector fitting and the safety belt buckle anchor for deactivating the motor in response to removal of the connector fitting from the safety belt buckle anchor.

4 Claims, 4 Drawing Figures

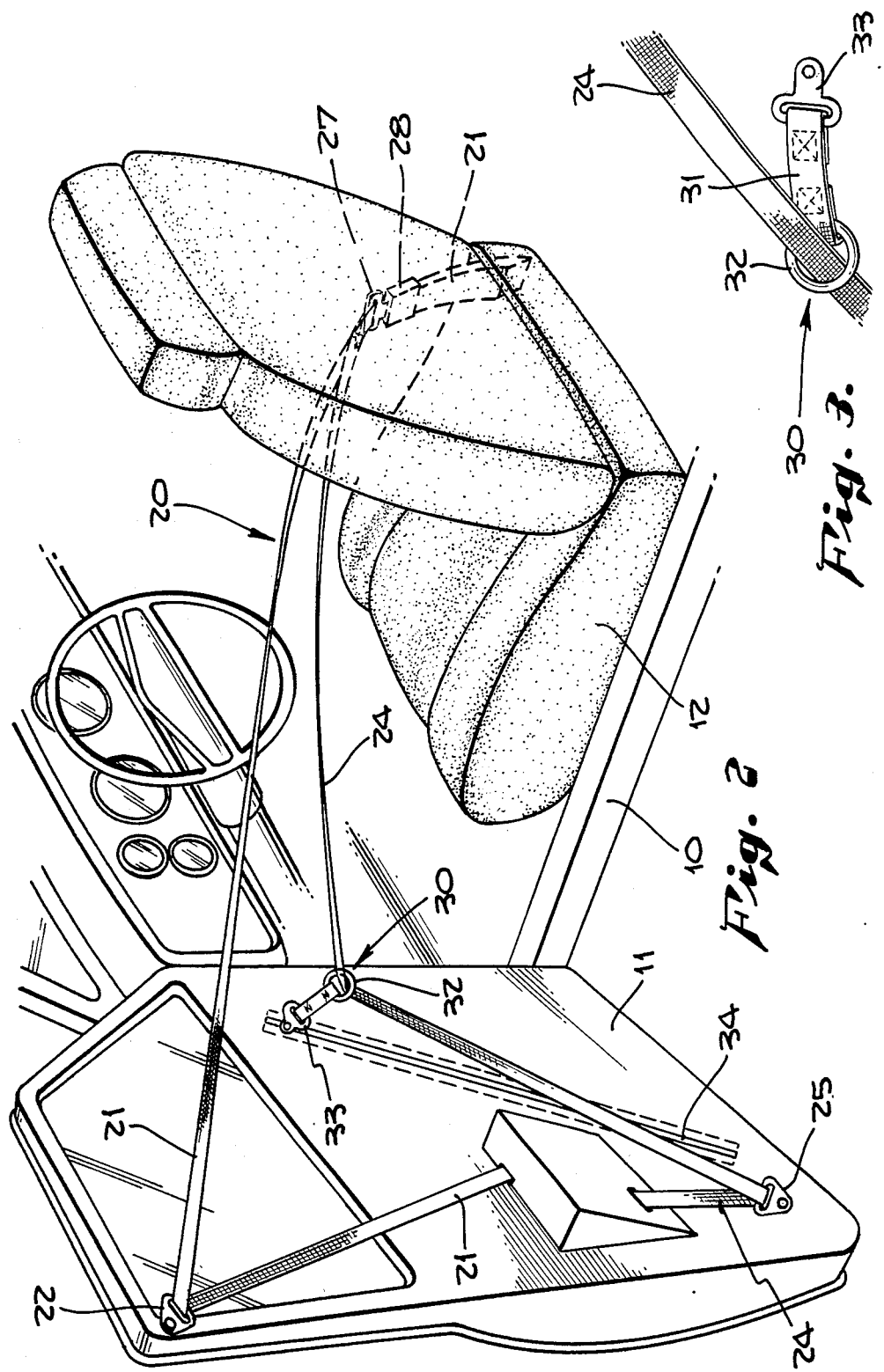

TWO RETRACTOR PASSIVE RESTRAINT SYSTEM

BACKGROUND OF THE INVENTION

The present invention relates in general to passive safety belt restraint systems for vehicles and more particularly to such a passive restraint system wherein the safety belt strap webbing is easily stowed by a pair of retractors mounted to a vehicle door located adjacent to the seat of the passenger being restrained.

Various types of three-point passive safety belt systems have been developed heretofore where portions of the safety belt are mounted to the vehicle door in an effort to utilize the normal opening movement of the vehicle door to assist in the movement of portions of the safety belt to a position out of the passenger's way to allow exit or entrance relative to the vehicle seat without hindrance from the restraint system. Exemplary of such references are prior U.S. Pats. Nos. 4,189,170; 4,245,856; and 4,357,035, each of which is assigned to the assignee of the present application. In these systems, a safety belt retractor was mounted inboard of the vehicle seat with the safety belt strap ends being either fixedly or releasably connected to the portions of the vehicle. Thus, as the vehicle door is opened or closed, the safety belt straps move relative to the passenger seated in the vehicle seat adjacent the door since the straps are normally anchored by a retractor inboard of the vehicle seat.

It would be more convenient to the passenger to have the inboard aspect of the restraint system stationary or releasably fixed relative to an inboard anchor and to have other portions of the system wound up or unwound relative retraction mechanism in such a way that the straps do not rub or move across the vehicle passenger. It is therefore the primary object of the present invention to disclose and provide a safety belt restraint system wherein the strap portions of the system which lie generally against the front of the passenger of the vehicle seat are so provided as to remain essentially stationary relative to the passenger when the vehicle door is opened or closed as part of a means for moving the restraint system by such door movement in a passive manner to place it out of the way of the passenger for exit when the door is opened and in a operative position restraining the passenger when the door is closed. It is a further object of the present invention to provide a restraint system wherein the safety belt straps can be entirely wound up in a neat and tidy arrangement adjacent to the vehicle door ready to be swung with the vehicle door out of the way when the passenger wishes to exit the vehicle and the system has been released from its inboard anchor.

SUMMARY OF THE INVENTION

Generally stated, the present invention in a safety belt restraint system for restraining a passenger in his seat of a moving vehicle having a passenger seat, a releasable anchor inboard of the passenger seat for releasively holding a safety belt connector fitting and a vehicle door outboard of the vehicle seat and adjacent thereto with a shoulder strap guide on an upper portion of the vehicle door, comprises the improvement therein including the provision of a pair of emergency locking safety belt retractors mounted in relatively close proximity to each other on a lower portion of the vehicle door in position to receive opposite ends of a single continuous safety belt strap, a safety belt strap having its ends mounted to the two retractors with one strap portion running through an upper shoulder belt guide on a portion of the door frame and an opposite end portion of the strap running through a belt guide at a lower portion of the door and a single connector fitting mounted in fixed relationship to a mid-portion of the safety belt strap and being so provided so as to be releasably received by an anchor fitting, which may be a conventional safety belt buckle, located inboard of the vehicle seat. The emergency locking retractors are provided with large diameter strap storage spools to facilitate winding the associated strap portions entirely thereon to cause the single safety belt strap to lie generally flat against an inner face of the vehicle door when the connector fitting is released from the associated inboard anchor and the retractors wind the strap thereon.

A strap lifting means, know per se, may be provided on the vehicle door in cooperating relationship with the single strap to lift a lap belt portion thereof upwardly along a vehicle door mounted track when the vehicle door is opened. To facilitate storage of the lap strap portions of the single safety belt strap adjacent the vehicle door when the connector fitting is released from the associated inboard anchor, a buckle associated electrical switch may be provided to sense the release of the connector fitting and to operate associated electrical means for deactivating the strap lifting means so that the lap strap is simply wound up on its associated retractor when the vehicle is opened and the connector fitting is released, as opposed to being moved up the vehicle door when the door is opened and the connector fitting is still connected to the inboard anchor.

A more complete understanding of the present invention in a two retractor passive restraint system will be afforded to those skilled in the art from a consideration of the following detailed description of a preferred exemplary embodiment. Reference will be made therein to the appended sheets of drawings which will be first described briefly.

BRIEF DESCRIPTION OF THE DRAWINGS

FIG. 2 is a view as in FIG. 1 showing the exemplary safety belt restraint system, in accordance with the present invention, with the position assumed thereby when the vehicle door is moved to an open position.

FIG. 3 is detailed view of the lap strap lifting means associated with a track on the vehicle door for lifting the lap belt out of the passenger's path of movement into and out of the vehicle when the door is opened as best seen in FIG. 2.

DETAILED DESCRIPTION OF THE PREFERRED EXEMPLARY EMBODIMENT

Figure 1:
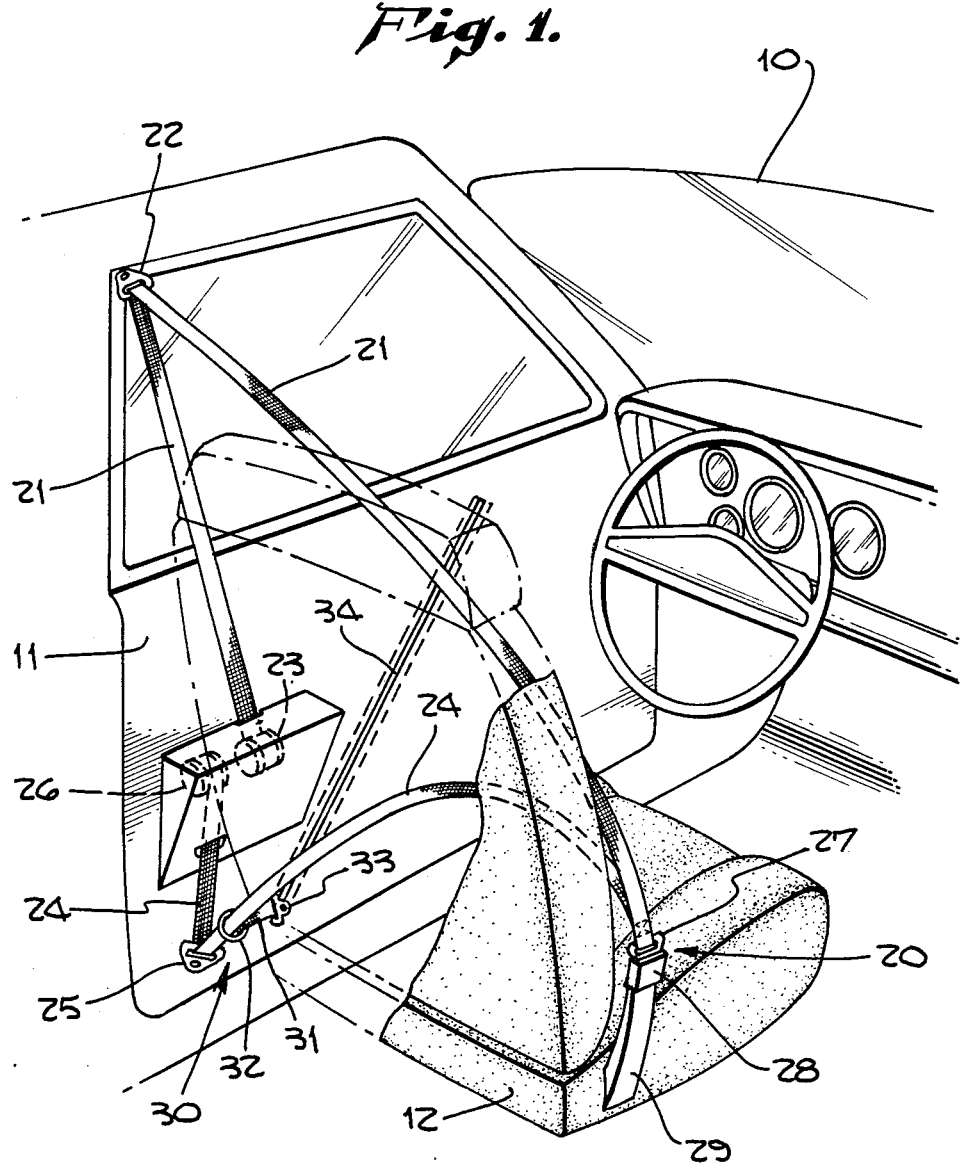
FIG. 1 is a perspective view, partially in section, of the interior of a conventional automotive vehicle with a preferred exemplary embodiment of the present invention in a safety belt restraint system shown installed in the vehicle with the vehicle door closed.

Referring now to FIG. 1, the interior of a conventional automotive vehicle 10 is illustrated with the vehicle door 11 shown closed adjacent to the driver's seat 12. In accordance with the present invention, a safety belt restraint system, indicated generally at 20, is provided for restraining the passenger in seat 12 in the event of an emergency condition experienced by the vehicle.

In the preferred exemplary embodiment, the exemplary safety belt restraint system, indicated generally at 20, includes a chest belt 21 which passes freely through belt guide 22, which is securely mounted to the vehicle door frame in known manner, belt 21 then continuing downwardly along the vehicle door inner surface to an emergency locking retractor 23 mounted in known manner to the vehicle door. The retractor 23 may be mounted within an arm rest portion of the vehicle door as illustrated in FIG. 1. More importantly, the emergency locking retractor may be of essentially conventional construction, i.e. locking in response to predetermined changes in vehicle inertia and/or strap acceleration, but should have an over sized reel to accommodate the entire length of safety belt strap 21 when it is wound up against the door as will subsequently be described. Also, a lap belt 24 will be provided as part of the restraint system and runs through a strap guide 25 mounted at the rear lower portion of the vehicle door 11 with the strap then running vertically upwardly along the inner surface of the vehicle door to emergency locking retractor 26 which is also mounted in known manner to the vehicle door. Retractor 26 may also be mounted within an arm rest portion of the vehicle door if convenient, as illustrated in FIG. 1, and preferably is of similar construction to that of retractor 23 with an oversized reel or belt storage spool such that all of the associated webbing of strap 24 can be wound up on the retractor spool or reel adjacent to the vehicle door when the system is released from an inboard anchor as will now be described.

Chest belt 21 and lap belt 24 may be provided as a single strap having its opposite ends connected to the two safety belt retractors 23 and 26 with a mid-portion being entrained through a belt slot or entraining means of conventional construction in anchor fitting or tongue plate 27. The straps are preferably sewn to each other adjacent to the anchor fitting 27, as seen in FIG. 1, so that the strap portions are individual fixed to the anchor fitting. Anchor fitting 27 is adapted to be releasably connected into a conventional safety belt buckle 28 mounted on the upper end of a anchor strap which may be provided in known manner within a housing 29 positioned on the inboard side of the vehicle seat. As is customary, the buckle 28 is connected by its associated strap to a structural portion of the vehicle seat or the vehicle frame.

With the safety belt restraint system as thus far described, the vehicle door may be opened or closed with the associated safety belt retractors 23 and 26 reeling in and reeling out, the associated chest belt 21 and lap belt 24 remaining fixed to the inboard anchor of fitting 27 which is connected into buckle 28, such that there is no rubbing of the straps across a passenger seated in his vehicle seat 12. To facilitate passenger exit from the vehicle, a strap lifting means, indicated generally at 30, may be provided to lift portions of the lap belt upwardly along the vehicle door as it is opened as can be seen in FIG. 2. The exemplary lifting means includes the provision of a lifting strap 31 which is attached at one end by a ring 32 to the lap belt 24, the latter sliding through ring 32 freely, and at its other end to a fitting 33 which runs within track 34 on the vehicle door. An associated track motor is operated by opening of the vehicle door; in known manner,: cause the fitting to move up the door and thereby lift the lap belt upwardly allowing free exit by the passenger from under the passive safety belt restraint system which remains in its connected relationship to the inboard anchor provided by fitting 27 being connected into buckle 28.

Figure 4:
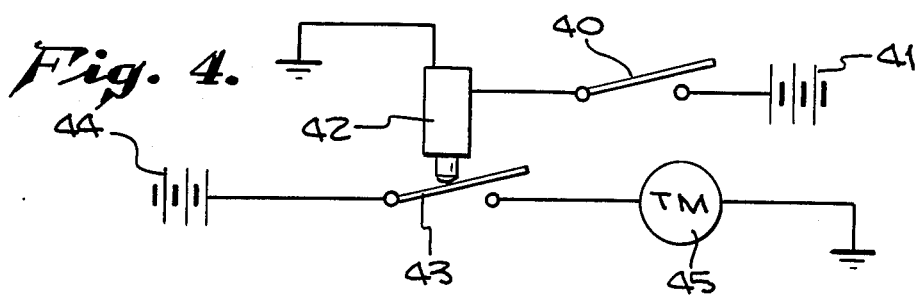
FIG. 4 is a schematic representation of an electrical-mechanical arrangement for deactivated the lap strap lifting means when the safety belt restraint system connector fitting is released from the anchor means located inboard of the vehicle seat in the exemplary embodiment.

In the event that the vehicle passenger wishes to stow the safety belt restraint system in an out-of-the-way position for freedom of movement into and out of the vehicle seat 12, it is contemplated within the present invention that when the inboard anchor provided in the system by the anchor fitting 27 is released the straps 21 and 24 will be wound up on the associated retractors 23 and 26 with the strap lifting means being deactivated. Preferably, a buckle operated switch of conventional or known form may be provided with association with buckle 28 which will be operated on release of the anchor fitting 27 from the buckle to deactivate the strap lifting means. As seen in FIG. 4 schematically, a buckle switch 40 may be operated from current from a source 41 when the buckle receives the anchor fitting 27 therein to normally maintain a solenoid 42 in a condition to normally close switch 43. Switch 43 may be in a conventional electrical circuit between a power source 44 and a motor 45 for the track system of the conventional door mounted track 34. When the anchor fitting 27 is removed from buckle 28, switch 40 is opened as seen in FIG. 4 which in turn causes an opening of switch 43 which deactivates the track motor 45. The belts thus merely wind up on the large diameter spools of the two retractors with the webbing being pulled essentially all against the side of the door and thus to a position out of the way when the vehicle is opened.

By virtue of this construction and mode of operation, when the safety belt straps 21 and 24 are released from the inboard anchor of buckle 28, they are wound up on the door and moved away from the door opening in such a manner as to not interfere with door closing or movement of passengers or cargo in and out of the vehicle door opening. Any tendency for safety belt webbing which would otherwise be stored adjacent to the B pillar from getting involved in the door closing mechanism is also avoided. When the door is opened with the straps fixed to the buckle 18 by the anchor fitting 27, the inward portion of the straps adjacent to the passenger remain essentially stationary with the belt simply unwinding from the retractors as the door swings outwardly. Any tendency of the safety belt straps to rub or move across a vehicle passenger located in the vehicle seat 12 as the door is opened or closed is thereby avoided.

Having thus described a preferred exemplary embodiment of the present invention in a safety belt restraint system, I claim:

1. A safety belt restraint system for restraining a passenger in a seat of a moving vehicle, a releasable anchor means inboard of the passenger seat for releasably holding a seat belt connector fitting and a vehicle door outboard of the vehicle seat, said restrain system comprising:

a shoulder strap guide on an upper portion of the door frame and a lap strap guide on a lower portion of the door frame vertically below said shoulder strap guide;

a pair of emergency locking safety belt retractors mounted in relatively close proximity to each other on said vehicle door between and in general vertical alignment with said shoulder strap and lap guides, respectively;

a single connector fitting for releasable connection to said anchor means and strap entraining means for slidably entraining a safety belt strap to said single connector fitting; and a safety belt strap having its opposite ends operably connected into individual ones of said pair of retractors for retraction and protraction at both ends thereof relative said retractors, said strap being fixed at a mid-portion to said strap entraining means of said connection fitting and passing in a first direction loosely through said lap strap guide and then upwardly to one of said retractors to provide a first portion of said strap between said one of said retractors and said strap entraining means as a lap belt portion of said system and said strap passing in a second direction from said strap entraining means upwardly to and loosely through said shoulder strap guide and then downwardly to a second one of said retractors to provide a second portion of said strap between said strap guide and the other of said retractors as a shoulder belt portion of the system;

a strap lifting means located forwardly on said door relative said retractors and cooperating with said strap lap belt portion between said lap strap guide and said fitting to lift said lap belt portion relative to said vehicle seat when said vehicle door is opened; said strap lifting means included a door mounted track, a track fitting connected to said strap lap belt portion and motor means for operating said track fitting on said track when said vehicle door is opened; and further comprising:

deactivating means associated with said releasable anchor means for deactivating said motor means of said strap lifting means in response to removal of said connector fitting from said anchor means.

2. An automatically retracting three point safety belt strap and retractor system for facilitating exit of a vehicle passenger from a vehicle seat on release of a single strap connector fitting from an associated anchor located inboard of said seat, said system comprising:

a single, two ended safety belt strap providing both lap belt and shoulder belt portions of the system;

a connector fitting means connected to a mid-portion of said strap for releasably connecting said strap mid-portion to said anchor said strap mid-portion being fixed in nonsliding relation to said fitting means;

a shoulder belt strap guide means on an upper portion of a door of said vehicle adjacent said seat and at approximately passenger shoulder height for entraining said strap therethrough at an upper end of said shoulder belt portion of said strap;

a first retractor means on said door for retractably mounting a first end of said strap; and a second retractor means on said door for retractably mounting a second end of said strap to said door; and a lap belt guide means on said door for entraining said strap therethrough and track means on said door forwardly of said lap belt guide means and including a track fitting provided for movement upwardly along an inner surface of said door when said door is opened to lift mid-portions of said strap relative said door when said door is opened without sliding portions of said strap relative to a passenger seated beneath said strap;

lifting means including motor means for operating said track fitting on said track when said door is opened; and deactivating means associated with said anchor and said connector fitting means for deactivating said motor means of said lifting means in response to removal of said connector fitting means from said anchor.

3. A safety belt restraint system for restraining a passenger in a seat of a moving vehicle having a releasable anchor means inboard of the passenger seat for releasably holding a seat belt connector fitting and a vehicle door outboard of the vehicle seat with a shoulder strap guide on an upper portion of the door frame, said restraint system comprising:

a pair of emergency locking safety belt retractors mounted in relatively close proximity to each other on said vehicle door near a lower portion thereof;

connector fitting means for releasable connection of a safety belt to said anchor means;

a safety belt having its opposite ends operably connected into individual ones of said pair retractors for retraction and protraction at both ends thereof relative said retractors, said belt including a first strap passing between said connection fitting and one of said retractors to provide a lap belt portion of said system and a second strap passing between said connector fitting and the other of said retractors and through said shoulder strap guide to provide a shoulder belt portion of the system;

motor driven strap lifting means cooperating with said first strap which provides said lap belt portion to lift said lap belt portion relative to said vehicle seat through operation of an associated motor means when said vehicle door is opened; and deactivating means associated with said releasable anchor means for deactivating the motor means of said strap lifting means in response to removal of said connector fitting from said anchor means.

4. An automatically retracting three point safety belt strap and retractor system for facilitating exit of a vehicle passenger from a vehicle seat on release of a single strap connector fitting from an associated anchor, said system comprising:

a single, two ended safety belt strap providing both lap belt and shoulder belt portions of the system;

a connector fitting means connected to a mid-portion of said strap for releasably connecting said strap mid-portion to said anchor;

a shoulder belt strap guide means on an upper portion of a door of said vehicle adjacent said seat and at approximately passenger shoulder height for entraining said strap therethrough at an upper end of said shoulder belt portion of said strap;

a first retractor means on said door for retractably mounting a first end of said strap;

a second retractor means on said door for retractably mounting a second end of said strap to said door whereby on release of said connector fitting means from said anchor, both ends of said two ended single safety belt strap are wound onto said door mounted retractors for movement of said entire strap with said door away from said vehicle seat and out of the path of vehicle exit of said passenger; a lap belt guide means on said door for entraining said strap therethrough and motor driven track means on said door mounting said lap belt guide means for movement upwardly along an inner surface of said door by operating of associated motor means when said door is opened to retract mid-portions of said strap to said door when said door is opened and said connector fitting is not released from said anchor; and deactivating means associated with said releasable anchor means for deactivating the motor means of said strap lifting means in response to removal of said connector fitting from said anchor means.

* * * * *